United States Patent [19]
Adcock et al.

[11] 3,729,838
[45] May 1, 1973

[54] EDUCATIONAL AND RECREATIONAL DEVICE

[76] Inventors: Carolyn Adcock, 3319 Heritage Place; Troy L. Stewart, 3320 Heritage Place, both of Raleigh, N.C.

[22] Filed: Feb. 3, 1971

[21] Appl. No.: 112,264

[52] U.S. Cl. ....................................................35/9 C
[51] Int. Cl. ..............................................G09b 7/06
[58] Field of Search......................35/9 C, 9 D, 31 C, 35/35 D

[56] References Cited

UNITED STATES PATENTS

| 3,389,479 | 6/1968 | Gross | 35/9 D |
|---|---|---|---|
| 3,106,784 | 10/1963 | Raley | 39/9 C |
| 2,627,672 | 2/1953 | Polton | 35/9 C |

*Primary Examiner*—Wm. H. Grieb
*Attorney*—John G. Mills, III

[57] ABSTRACT

In abstract, a preferred embodiment of this invention is a programmable, comparative response system in the form of an electrically conductive question card and a matched answer card adjacent contact circuit terminals. This system can be used as a teaching aid, a learning aid or a recreational device.

7 Claims, 8 Drawing Figures

Patented May 1, 1973　　3,729,838

CAROLYN P. ADCOCK
TROY L. STEWART
INVENTOR

BY John G. Mills
ATTORNEY

CAROLYN P. ADCOCK
TROY L. STEWART
INVENTOR

Patented May 1, 1973

CAROLYN P. ADCOCK
TROY L. STEWART
INVENTOR

BY John G. Mills PA
ATTORNEY

EDUCATIONAL AND RECREATIONAL DEVICE

This invention relates to programmed systems and more particularly to comparative response systems for educational and recreational purposes.

In the past, many educational and recreational devices have been developed to teach, train and test individuals. These systems have taken various forms including probes for completing electric circuits to indicate desirable or correct responses. These systems have, however, been relatively complex and too expensive to be used on a large scale. Also there has usually been very little versatility in allowing the individual to make up his own program for the device. Additionally it has been quite often possible for the user of the device to memorize answers since the same answers would reoccur invariably at the same location.

The present invention has been developed after much research and study into the above mentioned problems and is designed to give a programmed system that is simple to construct and maintain, is programmable by persons with little or no prior experience and does not lend itself to memorization of comparative equivalents. To accomplish this end, a simple wiring circuit is provided on a board like member with a plurality of question cards with various portions thereof being conductive. When the comparative equivalent or answer is correctly selected from a second grouping, a circuit will be completed and indicia, such as light or sound means, will be activated. Since the question and answer cards are preferably so constructed that the indicia thereon can be readily removed and changed, the entire system is easily reprogrammable.

It is, therefore, an object of the present invention to provide a changeable program, comparative response system for educational and recreational purposes.

Another object of the present invention is to provide a programmable, comparative response system that is simple in structure, inexpensive to maintain and yet versatile in use.

Another object of the present invention is to provide a programmable, comparative response system that is inexpensive in cost and yet is highly variable in use.

An additional object of the present invention is to provide a programmed, comparative response system wherein both the question and answer indicia can be readily changed or rearranged.

A further object of the present invention is to provide a comparative response system that prevents the user thereof from memorizing answers prior to use of the system.

Other objects and advantages of the present invention will become apparent and obvious from a study of the following description and the accompanying drawings which are merely illustrative of such invention.

Figure 1:
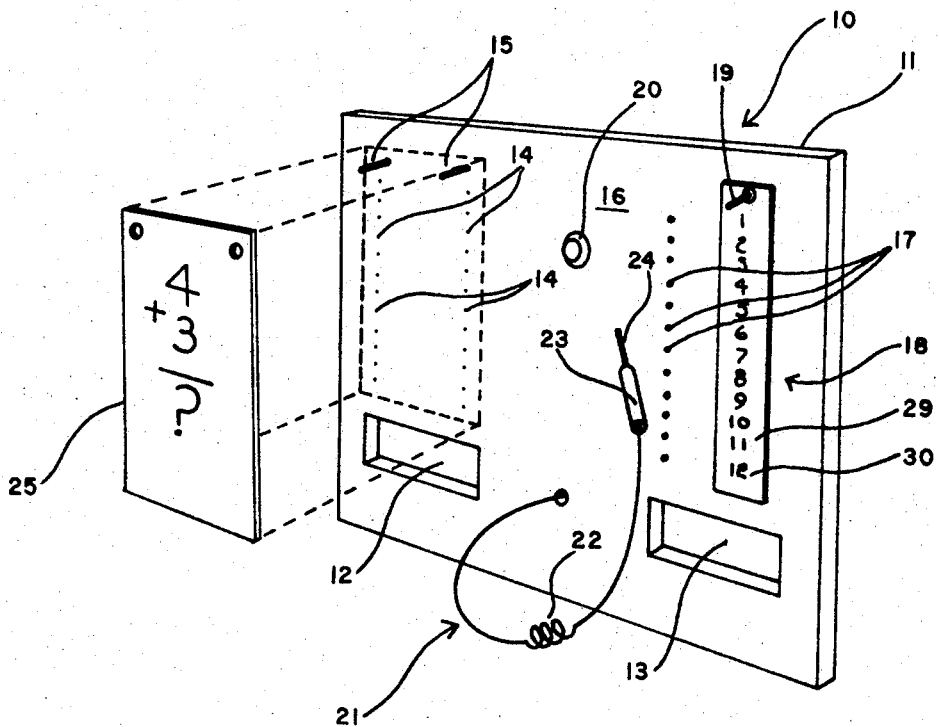
FIG. 1 is a perspective of the programmable comparative response system of the present invention showing the same ready for use.
Figures 2A, 2B, 2C, 2D:
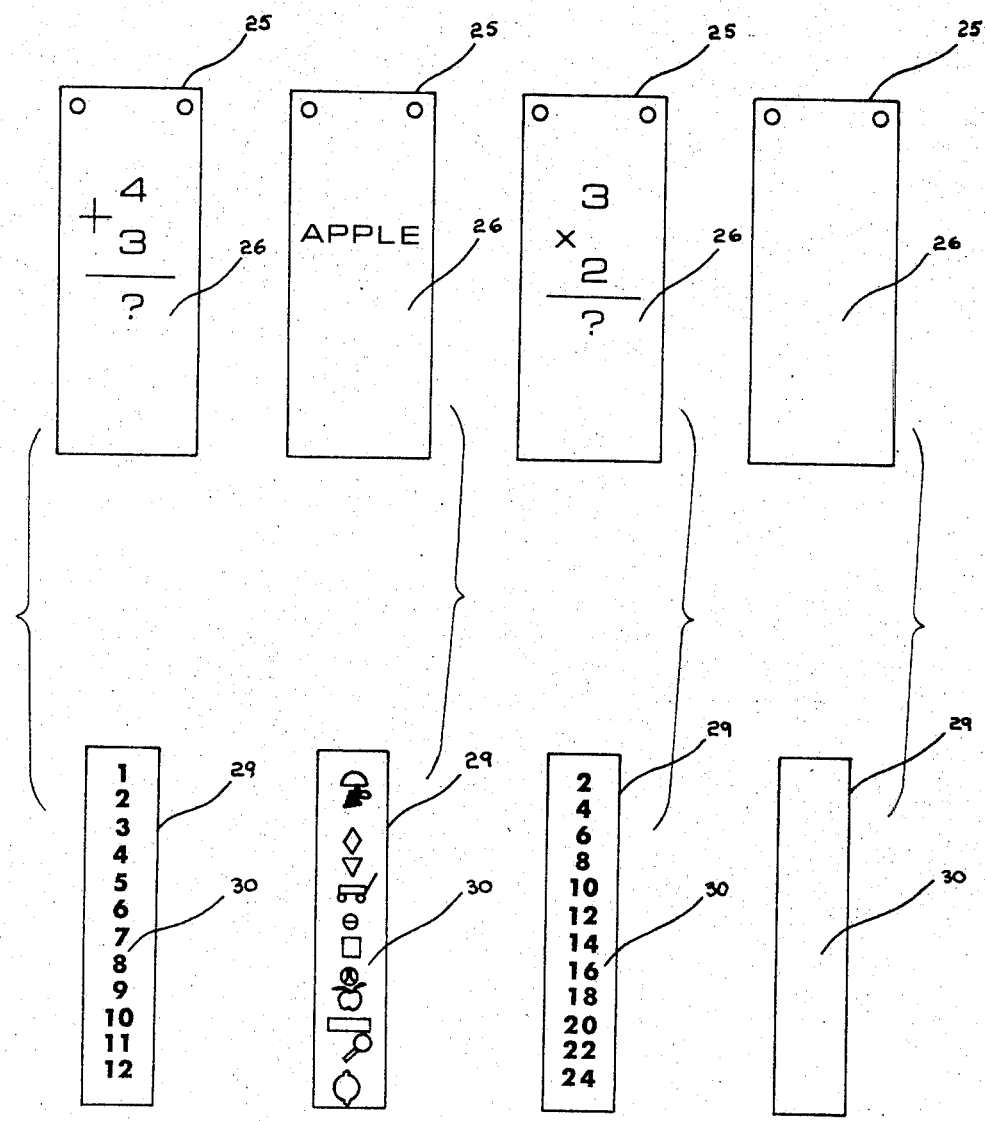
FIGS. 2A through 2D are front elevational views of various forms of question and answer cards.

With further reference to the drawings, the device of the present invention indicated generally at 10 is composed of a board-like member 11. In the lower portion of this board, as oriented in the drawings, is provided cutout areas 12 and 13 which are useable for storage of cards that will hereinafter be described in more detail.

Along one side of the front portion of the board 11 are a plurality of paired electrical contacts 14. Holding means such as mounted pegs 15 are provided in the area of the contacts 14 for holding cards or similar indicia carrying means as will hereinafter be further described.

Also on the front 16 of the board 11, preferably on the side opposite that of the contacts 14, is a second set of contacts 17. Adjacent these last mentioned contacts is a card or indicia area indicated generally at 18 where answer cards or other comparative material can be placed.

Holding means such as peg 19 can be provided for answer indicia 29, or the same can be adhesively secured or even magnetically attached to the face 16 of the board.

Preferably in the center portion of the front area 16 of the board 11 is a correct answer indicator such as light 20. Also secured to the board in central area is one end of the answer selector probe 21. This probe can be in any suitable form but a coil cord such as that indicated at 22 with a grip portion 23 on the end thereof having a conductive tip 24 projecting therefrom has been found very satisfactory.

The holding pegs 15 are adapted to receive indicia means such as the question card indicated at 25. The front side of this card can either contain printed indicia or can be left blank. If it is blank, the surface would preferably be of the erasable type.

The rear surface 27 of the question card 25 includes a conductive strip or area 28 which coincides with at least one of the pairs of contacts 14. This conductive area or strip can, of course, be produced by any one of a number of accepted procedures but the remainder of the back or rear 27 of the card must of composed of a non-conducting material.

The answer indicia card 29 is composed of no particular material although if question cards used therewith are of the erasable or changeable type, then the answer card would likewise be of the changeable or erasable type. If the answer card contains printed or pre-produced indicia this would coincide or be paired with one each of the singly exposed contacts 17. In other words, indicia on the front side 30 of card 25 would match each of the contacts 17.

The rear or back of the answer card 29 is of no particular form or material except that if a mounting or holding pin 19 is not used, some type of stick-on material would be. This material or backing can be an adhesive type material or a metallic and magnetic combination. One distinct possibility in this latter mentioned area would be to have a magnet embedded in the front surface of the board 11 and by using at least partially metal-backed answer cards, easy substitution thereof could be accomplished.

Figure 3:
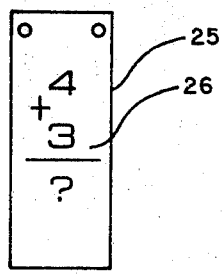
FIG. 3 is an enlarged front elevational view of a typical question type card.
Figure 4:
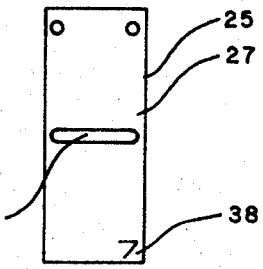
FIG. 4 is an enlarged rear elevational view of a typical question card.
Figure 5:
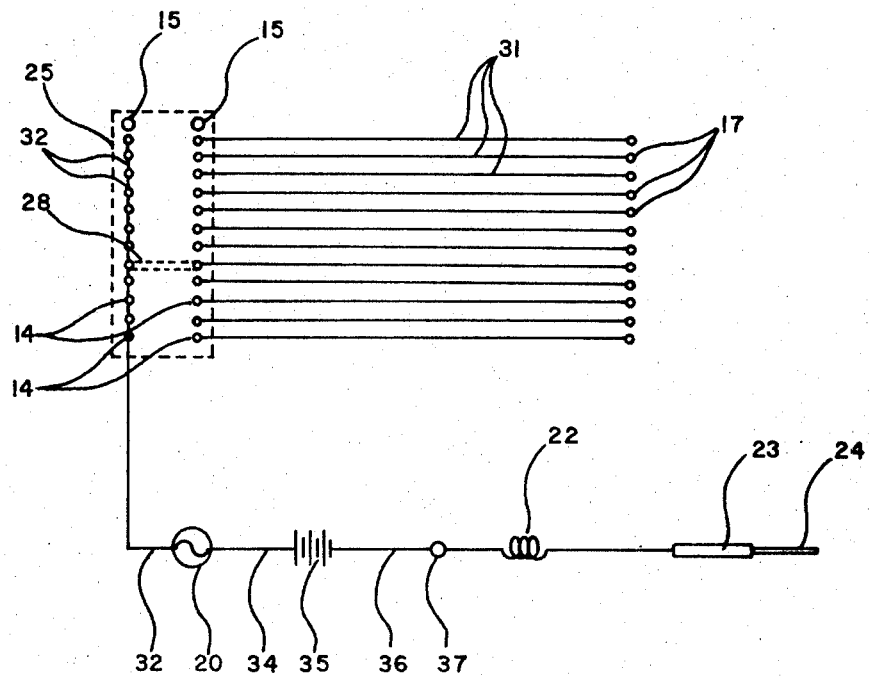
FIG. 5 is a schematic of a preferred electrical circuit used in connection with the present invention.

Referring specifically to the electrical circuitry disclosed in schematic form in FIG. 3, each of the answer contacts 17 are connected, respectively, to one side of its matched pair of question contacts 14 by means such as electrically conductive lines 31. Thus it can be seen that each pair of contacts on the question side is matched to one of the contacts on the answer side to create a plurality of circuits in parallel.

The side of the paired contacts 14 not connected to contacts 17 are all connected by line 32 in series. This line continues to the correct answer indicator 20 which is shown as a light although it could be a buzzer or other electrical contrivance, such as a combination visual and audible means. The correct answer indicia is connected by line 34 to a convenient source of electrical power such as battery 35 or household current.

The side of the electrical source opposite line 34 is connected by line 36 to probe terminal 37. To the probe terminal is connected insulated, electrically conductive coil cord 22. This cord terminates in an uninsulated conductive tip 24.

To complete a circuit through the electrical system as hereinabove described, two conditions must exist. First, the conductive strip 28 on the back 27 of a question card 25 must be aligned on the holding means 15 so that electrically conductive contact is made between a given set of paired electrically contacts 14. Second, the tip 24 of the selector probe 21 must make electrical contact with the contact 17 matched to the given connected contacts 14. Thus it can be seen that when the probe tip touches the correct contact 17, current can flow from battery 35 through line 36 and probe 21 to contact 17. From this contact, the current will flow through the associated line 31, across the paired contacts 14 by way of the conductive strip 28 of card 25 and then return to the battery via line 32, correct answer indicia 33 and line 34.

A closed circuit only exist as described above and when contact of the probe tip 24 is made with any of the contacts 17 other than the one connected to the pair of contacts 14 bridged by the conductive strip 28, an opening circuit will exist with no current flow through the correct answer indicator 20.

From the above, it is obvious that if a different question card is placed on the hold means 15 which has a differently located conductive strip on the back thereof from the previous card, a different contact 17 must be touched by the probe tip 24 for a closed circuit condition to exist. Thus as many questions and possible answers can be used as number of paired question contacts and matched answer contacts as are provided.

As heretofore indicated, contacts 17, as well as the paired contacts 14, are preferably exposed on the front 16 of the device 10. The remainder of the circuitry with the exception of the selective probe 21 and possibly the answer indicator 20, can and preferably would be located either in the interior of the board 11 or on the back side thereof. If this circuitry is placed on the exposed back portion of the board, it may be incapsulated in plastic or other non-conductive material for protection and increased aesthetic quality.

Referring specifically to the changeable card means, if prepared or printed cards are used, the type adapted to be placed above the paired electrical contacts 14 would be considered the question cards while the type adapted to be placed adjacent the row of contacts 17 would be considered the answer cards. These cards are used very similar to the well known "flash cards" for instruction purposes except the individual can drill himself without the help of another person. When a correct answer choice is made, the electrically operated correct answer indicator 20 will be activated to inform the user of his correct choice.

Usually a plurality or relatively large number of question cards 25 would be used in conjunction with a single answer card 29. Once a series of question cards have been used in conjunction with the single answer card, that series can be removed completely from the board and a new series started by placing the new answer card adjacent contacts 17 and the first question card over the paired contacts 14.

Blank question and answer cards can be provided with either an erasable front surface or a non-erasable surface. On the back of each of these question cards is preferably placed a small size number 38 which would coincide with one of the matched sets of contacts. In other words, the small printed number would be a number between 1 and 15 if the board contained a total of 15 paired and matched contacts. The specific number used would indicate the set of contacts 14 that would be bridged by the conductive strip 28 on the back of such card. Thus, if for example, a small 5 was printed on the back of a card, that card would bridge the fifth pair of contacts down from the top; if the small number was 3, the conductive strip on that card would bridge the third pair of contacts down; etc.

From the above, it can be seen that the question written on the blank question card can have its answer placed at the correct location on the answer card so a closed circuit will occur when the terminal 17 adjacent the correct answer is chosen.

To increase the versatility of the device of the present invention, the front or exposed side of the blank question and answer cards can be of a nonporous material so that erasable markers such as grease pencils can be used. It is also envisioned that chalk boards and other erasable type surfaces can likewise be used.

From the above, it is obvious that the present invention has the advantage of being readily useable by even a very young child and yet can be used to advantage in adult learning processes. The device is equally adapted to be used for either educational or recreational purposes and can be programmed to meet the individual users needs for fancy. The device of the present invention is inexpensive to manufacture and thus would be relatively inexpensive when purchased retail. Because of the versatility of the self-programming feature, the useful life of the device is virtually unlimited.

The terms "upper," "front," "back, " and so forth have been used herein merely for convenience to describe the comparative response device and its parts as oriented in the drawings. It is to be understood, however, that these terms are in no way limiting to the invention since the device may obviously be disposed in the different positions when it is used.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A comparative answer educational and recreational device comprising: a generally flat board having a front portion and a back portion; a multiplicity of paired, normally unconnected question contacts disposed on the front of said board and extending therethrough; a multiplicity of answer contacts disposed on the front of said board and extending therethrough, each of said last mentioned contacts being connected to one contact of a matching set of paired question contacts; a common means connecting all of the unconnected contacts of the paired question contacts, said common connecting means passing through a correct answer indicating means and operatively connected to an electrical power source; a single answer selector probe operatively connected to said power source and being extensible to allow connection with all answer contacts; question card means disposed juxtaposed to said paired question contacts and having question indicia on the front side thereof and only a single conducting strip extending across the rear side for conductively connecting the contacts of one of said pair of question contacts; and answer indicia disposed adjacent said answer contacts whereby when the indicia on said question card and that adjacent said answer contacts are properly matched by connecting said probe to the answer contact adjacent the correct answer indicium, current will flow from said power source, through said selector probe, said answer contact, said matched paired question contact, said conductive area of said card, and said correct answer indicating means back to said power source to actuate and operate said last mentioned means.

2. The device of claim 1 wherein the connecting means between said question and said answer contacts and the connecting means between said question means and said power source are disposed juxtaposed to the back portion of said board.

3. The device of claim 1 wherein the power source is a battery.

4. The device of claim 1 wherein the power source is household current.

5. The device of claim 1 wherein the correct answer indicating means is a visual type means.

6. The device of claim 1 wherein the correct answer indicating means is a means of the audible type.

7. The device of claim 1 wherein the correct answer indicating means is a combination visual and audible means.

\* \* \* \* \*